(12) United States Patent
Li et al.

(10) Patent No.: US 11,295,532 B2
(45) Date of Patent: Apr. 5, 2022

(54) METHOD AND APPARATUS FOR ALIGNING 3D MODEL

(71) Applicant: Samsung Electronics Co., Ltd., Suwon-si (KR)

(72) Inventors: Weiming Li, Beijing (CN); Hyong Euk Lee, Suwon-si (KR); Hao Wang, Beijing (CN); Seungin Park, Yongin-si (KR); Qiang Wang, Beijing (CN); Yang Liu, Beijing (CN); Yueying Kao, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 16/674,139

(22) Filed: Nov. 5, 2019

(65) Prior Publication Data

US 2020/0160616 A1 May 21, 2020

(30) Foreign Application Priority Data

Nov. 15, 2018 (CN) .......................... 201811359461.2
Jul. 18, 2019 (KR) ........................ 10-2019-0087023

(51) Int. Cl.
*G06T 19/20* (2011.01)
*G06T 7/70* (2017.01)
(Continued)

(52) U.S. Cl.
CPC ............ *G06T 19/20* (2013.01); *G06K 9/6215* (2013.01); *G06N 3/08* (2013.01); *G06N 20/00* (2019.01);
(Continued)

(58) Field of Classification Search
CPC ... G06T 19/20; G06T 7/70; G06T 2219/2004; G06N 20/00; G06N 3/08; G06K 9/6215
See application file for complete search history.

(56) References Cited

U.S. PATENT DOCUMENTS 8,437,537 B2   5/2013   Chang et al.
8,467,596 B2   6/2013   Abadpour et al.
(Continued)

FOREIGN PATENT DOCUMENTS

KR   10-2008-0018785 A   2/2008
KR   10-2015-0002157 A   1/2015
(Continued)

OTHER PUBLICATIONS

Xiang, Yu et al., "Beyond PASCAL: A Benchmark for 3D Object Detection in the Wild", *IEEE Winter Conference on Applications of Computer Vision*, 2014 (pp. 1-8).

(Continued)

*Primary Examiner* — Fayyaz Alam
(74) *Attorney, Agent, or Firm* — NSIP Law

(57) ABSTRACT

Provided is a method and apparatus for aligning a three-dimensional (3D) model. The 3D model alignment method includes acquiring, by a processor, at least one two-dimensional (2D) image including an object, detecting, by the processor, a feature point of the object in the at least one 2D input image using a neural network, estimating, by the processor, a 3D pose of the object in the at least one 2D input image using the neural network, retrieving, by the processor, a target 3D model based on the estimated 3D pose, and aligning, by the processor, the target 3D model and the object based on the feature point.

17 Claims, 10 Drawing Sheets

(51) Int. Cl.
*G06N 3/08* (2006.01)
*G06N 20/00* (2019.01)
*G06K 9/62* (2022.01)

(52) U.S. Cl.
CPC ........ *G06T 7/70* (2017.01); *G06T 2219/2004* (2013.01)

(56) References Cited

U.S. PATENT DOCUMENTS

| | | | |
|---|---|---|---|
| 9,367,922 | B2 | 6/2016 | Chandraker et al. |
| 9,418,480 | B2 | 8/2016 | Issa et al. |
| 9,818,043 | B2 | 11/2017 | Sala et al. |
| 10,482,674 | B1* | 11/2019 | Wu .................. G06N 20/00 |
| 10,885,659 | B2* | 1/2021 | Li ...................... G06T 7/55 |
| 2014/0321735 | A1 | 10/2014 | Zhang et al. |
| 2014/0376775 | A1 | 12/2014 | Datta et al. |
| 2019/0026917 | A1* | 1/2019 | Liao .................. G06N 3/0454 |
| 2019/0147221 | A1* | 5/2019 | Grabner .............. G06T 7/75 382/103 |
| 2019/0251744 | A1* | 8/2019 | Flagg ................ G06T 17/10 |
| 2019/0304134 | A1* | 10/2019 | Mauchly ............. G06T 15/20 |
| 2020/0043186 | A1* | 2/2020 | Selviah .............. G06K 9/6203 |
| 2021/0174604 | A1* | 6/2021 | Long ................. G06T 7/344 |
| 2021/0201565 | A1* | 7/2021 | Dibra ................ G16H 50/70 |

FOREIGN PATENT DOCUMENTS

| | | |
|---|---|---|
| KR | 10-2016-0081828 A | 7/2016 |
| KR | 10-1776621 B1 | 9/2017 |
| KR | 10-1819730 B1 | 1/2018 |
| KR | 10-1840563 B1 | 3/2018 |

OTHER PUBLICATIONS

Su, Hao et al., "Render for CNN: Viewpoint Estimation in Images Using CNNs Trained with Rendered 3D Model Views", *2015 IEEE International Conference on Computer Vision (ICCV)*, 2015 (pp. 2686-2694).

Li, Chi et al., "Deep Supervision with Shape Concepts for Occlusion-Aware 3D Object Parsing", *2017 IEEE Conference on Computer Vision and Pattern Recognition (CVPR)*, 2017 ( pp. 1-10).

Grabner, Alexander et al., "3D Pose Estimation and 3D Model Retrieval for Objects in the Wild", 2018 IEEE/CVF Conference on Computer Vision and Pattern Recognition, 2018 (pp. 3022-3031).

Kao, Yueying, et al. "An Appearance-and-Structure Fusion Network for Object Viewpoint Estimation." *Proceedings of the Twenty-Seventh International Joint Conference on Artificial Intelligence*, Stockholm, Sweden, Jul. 13-19, 2018 (pp. 4929-4935).

"Understanding ARKit Tracking and Detection", https://developer.apple.com/videos/play/wwdc2018/610/, Last visited Nov. 5, 2019.

* cited by examiner

METHOD AND APPARATUS FOR ALIGNING 3D MODEL

CROSS-REFERENCE TO RELATED APPLICATIONS

This application claims the benefit under 35 USC § 119(a) of Chinese Patent Application No. 201811359461.2 filed on Nov. 15, 2018 in the State Intellectual Property Office of the People's Republic of China and Korean Patent Application No. 10-2019-0087023 filed on Jul. 18, 2019 in the Korean Intellectual Property Office, the entire disclosures of which are incorporated herein by reference for all purposes.

BACKGROUND

1. Field

The following description relates to aligning a three-dimensional (3D) model in an object of a two-dimensional (2D) input image.

2. Description of Related Art

Augmented reality (AR), as a single virtual reality (VR) field, refers to a computer graphics technique for composing a virtual item or information in a real world such that the virtual object or information may appear that it is present in the real world. Interaction with an item or an object displayed in augmented reality may enhance user experience. An object recognition technique is used to display the object in augmented reality and a neural network may be used to recognize an object. Using the neural network, an object included in an input image is quickly and accurately recognized.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of aligning a three-dimensional (3D) model, the method including acquiring, by a processor, at least one two-dimensional (2D) image including an object, detecting, by the processor, a feature point of the object in the at least one 2D input image using a neural network, estimating, by the processor, a 3D pose of the object in the at least one 2D input image using the neural network, retrieving, by the processor, a target 3D model based on the estimated 3D pose, and aligning, by the processor, the target 3D model and the object based on the feature point.

The acquiring of the at least one 2D input image may include receiving a first 2D input image including the object of a first pose and a second 2D input image including the object of a second pose that may be different from the first pose.

The acquiring of the at least one 2D input image may include receiving a first 2D input image including the object of a first pose, and generating a second 2D input image including the object of a second pose that may be different from the first pose.

The method may include detecting the object in the at least one 2D input image.

The estimating of the 3D pose may include classifying a type of the object using the neural network, and estimating the 3D pose of the object based on a result of the classification using the neural network.

The retrieving of the target 3D model may include acquiring a first feature of the object in the at least one 2D input image, acquiring a second feature of a candidate 3D model from among candidate 3D models, and determining the candidate 3D model to be the target 3D model based on the first feature and the second feature.

The determining may include calculating a similarity between the first feature and the second feature, and determining the candidate 3D model to be the target 3D model based on the similarity.

The method may include adjusting the object or the target 3D model based on the estimated 3D pose, the feature point of the object, and a feature point of the target 3D model.

The adjusting may include adjusting the target 3D model or the object using the estimated 3D pose, and readjusting the adjusted object or the adjusted target 3D model based on the feature point of the object and the feature point of the target 3D model.

The adjusting may include adjusting the object or the target 3D model based on the feature point of the object and the feature point of the target 3D model, and readjusting the adjusted object or the adjusted target 3D model based on the estimated 3D pose.

In another general aspect, there is provided a method of training a neural network, the method including acquiring, by a processor, at least one training two-dimensional (2D) input image including an object, estimating, by the processor, a three-dimensional (3D) pose of the object in the at least one training 2D input image using the neural network, retrieving, by the processor, a target 3D model based on the estimated 3D pose, detecting, by the processor, a feature point of the object in the at least one training 2D input image using the neural network, and training, by the processor, the neural network based on the estimated 3D pose or the detected feature point.

The estimating of the 3D pose may include classifying a type of the object using the neural network, estimating the 3D pose of the object based on a result of the classification using the neural network, and the training of the neural network may include training the neural network based on the classified type.

The method may include acquiring a composite image of at least one candidate 3D model of the estimated 3D pose, and classifying a domain of each of the at least one training 2D input image and the composite image using the neural network, wherein the training of the neural network may include training the neural network based on the classified domain.

The acquiring of the composite image may include acquiring a first composite image of a first candidate 3D model of the estimated 3D pose, a second composite image of the first candidate 3D model of a second pose, a third composite image of a second candidate 3D model of the estimated 3D pose, a fourth composite image of the second candidate 3D model of the second pose, and the at least one candidate 3D model comprising the first candidate 3D model and the second candidate 3D model.

The similarity between the first candidate 3D model and the object may be greater than or equal to a threshold and a similarity between the second candidate 3D model and the object may be less than the threshold.

In another general aspect, there is provided an apparatus for aligning a three-dimensional (3D) model, the apparatus including a memory configured to store a neural network and instructions, a processor configured to execute the instructions to acquire at least one two-dimensional (2D) image including an object, detect a feature point of the object in the at least one 2D image using the neural network, estimate a 3D pose of the object in the at least one 2D image using the neural network, retrieve a target 3D model based on the estimated 3D pose, and align the target 3D model and the object based on the feature point.

Other features and aspects will be apparent from the following detailed description, the drawings, and the claims.

Figure 1:
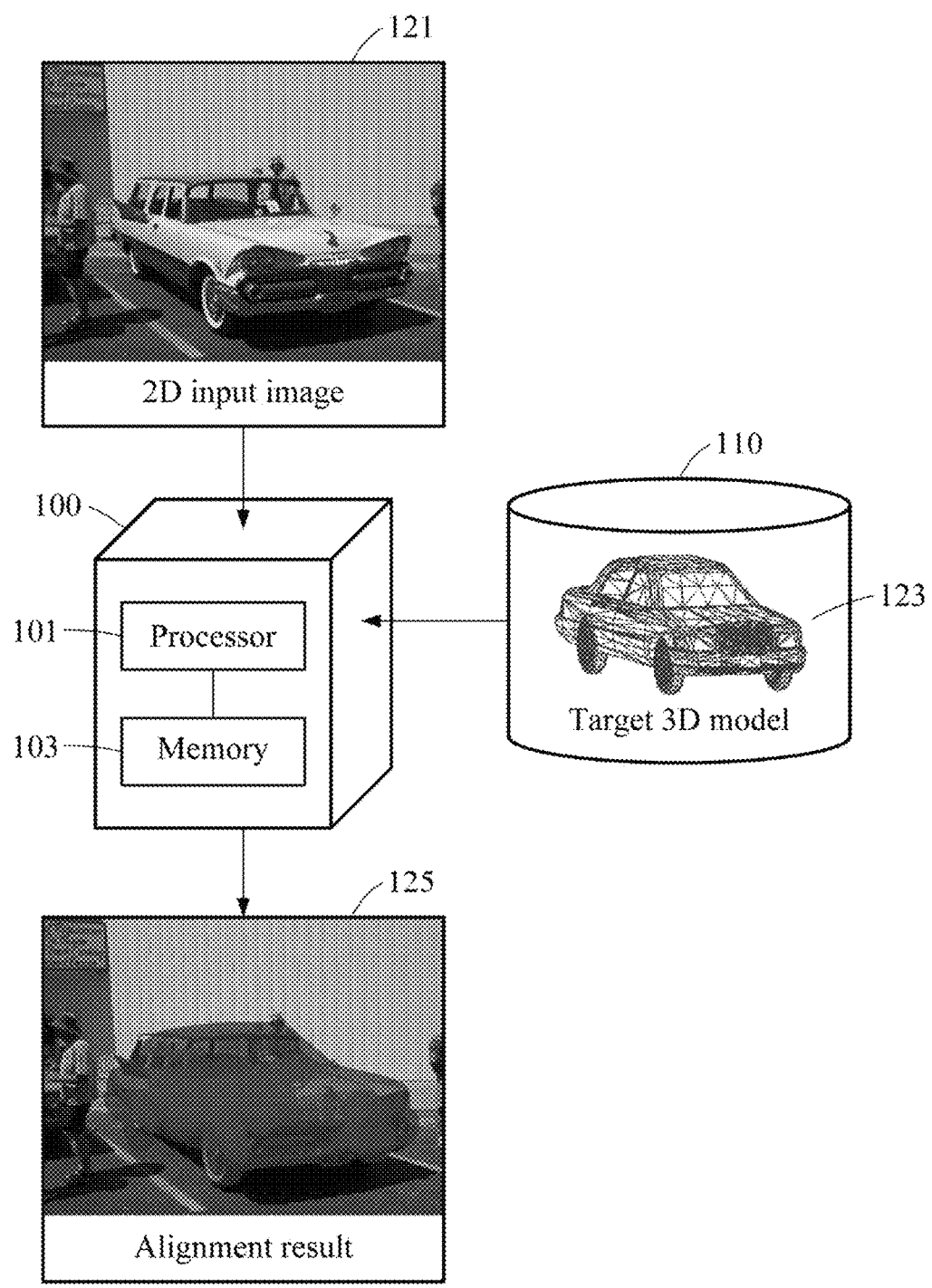
FIG. 1 illustrates an example of a configuration of a three-dimensional (3D) model alignment apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Hereinafter, the examples are described with reference to the accompanying drawings. Like reference numerals used in the drawings refer to like components throughout although they are illustrated in the different drawings.

FIG. 1 illustrates an example of a three-dimensional (3D) model alignment apparatus.

In one example, a 3D model alignment apparatus 100 may retrieve a 3D model corresponding to a two-dimensional (2D) image and may align the 3D model in an object included in the 2D image. The 3D model alignment apparatus 100 may provide user experience of further enhanced augmented reality (AR) by aligning the object of the 2D image and the 3D model corresponding thereto.

Referring to FIG. 1, the 3D model alignment apparatus 100 receives an 2D input image 121, retrieves a target 3D model 123 corresponding to the 2D input image 121 from the database 110, and align an object of the 2D input image 121 and the target 3D model 123. The 3D model alignment apparatus 100 may align the object of the 2D input image 121 and the target 3D model 123 using a neural network.

In an example, the 3D model alignment apparatus 100 may accurately retrieves the target 3D model 123 using 2D images captured at various viewpoints. In an example, the 3D model alignment apparatus 100 may accurately retrieve the target 3D model 123 that matches the 2D input image 121, based on different pieces of information provided from the 2D images captured at different viewpoints.

In an example, the 3D model alignment apparatus 100 enhances a user convenience by generating 2D images of various viewpoints using only the 2D input image 121 of a single viewpoint. The 3D model alignment apparatus 100 may receive the 2D input images 121 of different viewpoints and may also generate 2D images of different viewpoints based on the received 2D input image 121. Accordingly, a number of 2D input images 121 to be input decreases and the availability of the 3D model alignment apparatus 100 may be improved.

The 3D model alignment apparatus 100 may enhance accuracy of alignment through stepwise approaches of estimating a 3D pose of the 2D input image 121, retrieving the target 3D model 123, and aligning the 2D input image 121 and the target 3D model 123. The 3D model alignment apparatus 100 may derive a further accurate alignment result 125 by adjusting an object or a 3D model based on the estimated 3D pose or the detected feature point. In an example, the 3D model alignment apparatus 100 may further accurately align the object of the 2D input image 121 and the target 3D model 123 using the neural network in the enhanced structure.

To this end, the 3D model alignment apparatus 100 includes at least one processor 101 and a memory 103 configured to store the neural network. The 3D model alignment apparatus 100 may further include a database 110. The database 110 may be included in the 3D model alignment apparatus 100 or may be present as an external apparatus. The database 110 may store 3D models.

The 3D model alignment apparatus 100 acquires at least one 2D input image including an object. For example, the 2D input image may be a 2D image represented using a red, green, blue (RGB) channel. At least one object may be included in the 2D input image. When a plurality of objects are included in the 2D input image, the 3D model alignment apparatus 100 may process the 2D input image including the plurality of objects at a time and may divide and process the 2D input image for each object.

The processor 101 detects a feature point of an object in the 2D input image using the neural network. Here, the feature point may also be referred to as a key point or a landmark. Other indications capable of distinguishing the object and the background may be used may be used without departing from the spirit and scope of the illustrative examples described. In an example, the feature point may be detected based on the same reference regardless of a type of the object or the background. In another example, the feature point may be detected based on a different reference according to a type of the object or the background.

The processor 101 estimates a 3D pose of an object in the 2D input image using the neural network. The processor 101 classifies a type of the object using the neural network. The processor 101 estimates a 3D pose of the object using the neural network based on a result of the classification.

The processor 101 retrieves a target 3D model based on the estimated 3D pose. The processor 101 compares the object and each of a plurality of candidate 3D models from the database 110 based on the estimated 3D pose. The processor 101 determines a candidate 3D model most that is similar to the object as the target 3D model.

The processor 101 aligns the target 3D model and the object based on the feature point. The processor 101 may align the object and the target 3D model based on the 3D pose. An error may be present in the alignment. Therefore, the processor 101 may adjust the object or the target 3D model based on the 3D pose and the feature point. Through this, the processor 101 may derive an accurate result of the alignment.

In one example, the 3D model alignment apparatus 100 may be variously applicable in an augmented reality field. The 3D model alignment apparatus 100 may estimate a motion of the object. The 3D model alignment apparatus 100 may display a texture on the surface of the object or may be used for drawing or rendering. The 3D model alignment apparatus 100 may be used to display a virtual 3D image in association with the object. For example, the 3D model alignment apparatus 100 may display the virtual 3D object based on a position of the object. The 3D model alignment apparatus 100 may be used to adjust the virtual 3D image displayed in association with the object. The 3D model alignment apparatus 100 may be used to update or control a pose of the virtual 3D image displayed in association with the object.

For example, 3D information of an object provided by the 3D model alignment apparatus 100 may assist interaction between a plurality of objects in augmented reality. In an example, a motion or intention of a traffic device present in the augmented reality may be estimated based on the 3D information of the object. This function may be applied to autonomous driving. In response to a movement of an object, a 3D effect may be displayed based on the 3D information of the object. They are provided as an example only. The 3D model alignment apparatus 100 may apply to various fields. In addition to the augmented reality, 3D model and pose information of the object may apply in many fields, such as autonomous driving and robotics.

Figure 2:
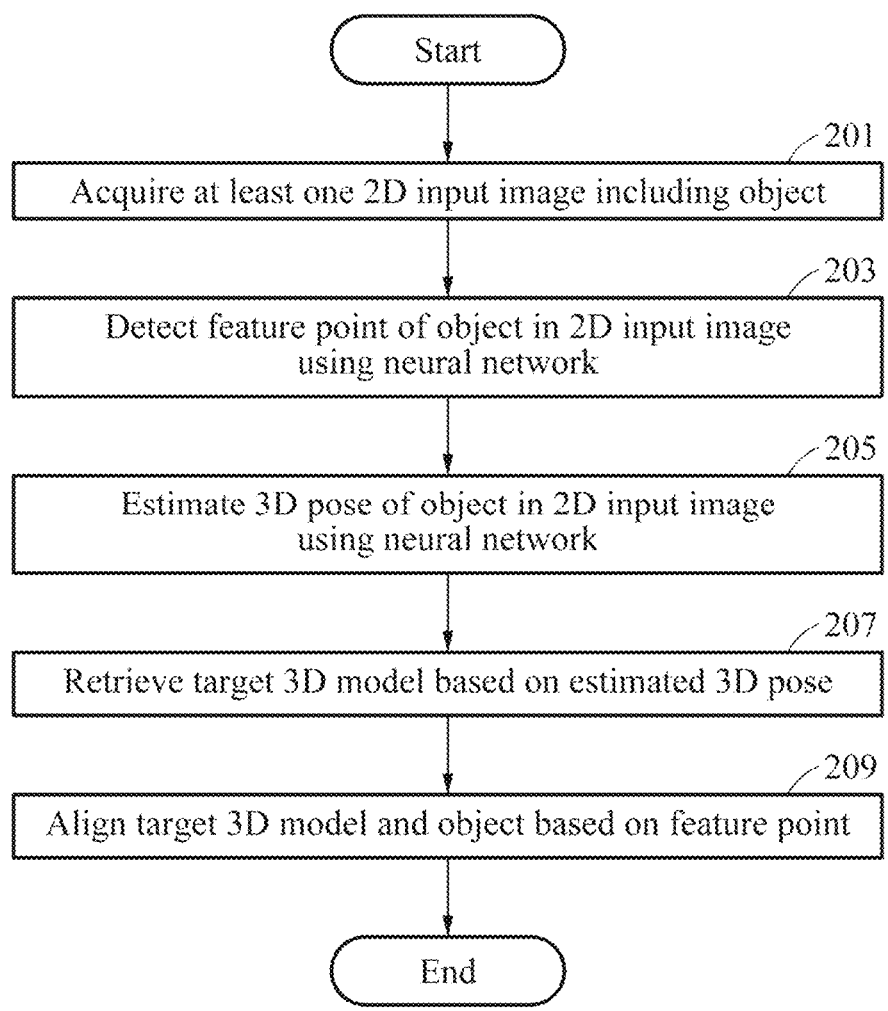
FIG. 2 is a diagram illustrating an example of a 3D model alignment method.

FIG. 2 is a diagram illustrating an example of a 3D model alignment method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, and devices such as a processor, that perform the specified functions, or combinations of special purpose hardware and computer instructions. In addition to the description of FIG. 2 below, the descriptions of FIG. 1 is also applicable to FIG. 2 and are incorporated herein by reference. Thus, the above description may not be repeated here.

Referring to FIG. 2, in operation 201, the 3D model alignment apparatus 100 acquires a 2D input image including an object. For example, the 2D input image may be an image represented using an RGB channel. In an example, the 3D model alignment apparatus 100 generates the 2D input image including the object of a second pose from the 2D input image including the object of a first pose. Accordingly, the 3D model alignment apparatus 100 may reduce a number of 3D input images required and may also simultaneously enhance availability and accuracy by acquiring information of an object captured at various viewpoints or of a 3D pose.

In operation 203, in an example, the 3D model alignment apparatus 100 detects a feature point of the object in the 2D input image using the neural network. The 3D model alignment apparatus 100 may identify a position of the feature point of the object, where the neural network is trained to detect the feature point of the object. In another example, a feature point of a candidate 3D model may be predetermined. The feature point of the object may be used to align a target 3D model and the object. The feature point of the object may be used to adjust the 2D input image including the object or the target 3D model.

In operation 205, the 3D model alignment apparatus 100 estimates a 3D pose of the object in the 2D input image using the neural network. The 3D model alignment apparatus 100 identifies a type of the object using the neural network. In an example, the 3D model alignment apparatus 100 estimates the 3D pose of the object based on the identified type of the object. In an example, the 3D model alignment apparatus 100 estimates three degrees of freedom (DoF) (distance and principal point) of the object and remaining three DoF (azimuth, elevation, and in-plane rotation). The 3D model alignment apparatus 100 acquires the 3D pose represented using six DoF. In an example, coordinates of the principal point have two DoF.

In operation 207, the 3D model alignment apparatus 100 retrieves the target 3D model based on the estimated 3D pose. The 3D model alignment apparatus 100 compares a feature point of an object of each 2D input image and a feature point of a candidate corresponding 3D model and determines a candidate 3D model having a relatively high similarity as the target 3D model.

In operation 209, the 3D model alignment apparatus 100 aligns the target 3D model and the object based on the feature point. In an example, the 3D model alignment apparatus 100 aligns the object and the target 3D model based on the feature point of the object detected using the neural network and a feature point of the target 3D model. In an example, alignment may be performed using methods using methods such as, matching and mapping.

In an example, the 3D model alignment apparatus 100 adjusts the object or the target 3D model based on the estimated 3D pose, the feature point of the object, and the feature point of the target 3D model. In an example, the estimated 3D pose, the target 3D model, and the feature point may be inaccurate. Since an error may be present in the detected object and the estimated 3D pose, the 3D model alignment apparatus 100 additionally adjusts the object of the 2D input image and the target 3D model based on the estimated 3D pose, the feature point of the object in the 2D input image, and the feature point of the target 3D model. In an example, the adjustment may refer to calibration or correction. Accordingly, the 3D model alignment apparatus 100 may further enhance the accuracy of the estimated 3D pose, the target 3D model, and the object included in the 2D input image.

The 3D model alignment apparatus 100 adjusts the target 3D model or the object based on the estimated 3D pose. In an example, the 3D model alignment apparatus 100 readjusts the adjusted object or the adjusted target 3D model based on the feature point of the object and the feature point of the target 3D model.

For example, the 3D model alignment apparatus 100 calculates three DoF (distance, principal point) of an object having an error using an error detection frame and estimates remaining three DoF (azimuth, elevation, in-plane rotation) using the neural network. The 3D model alignment apparatus 100 acquires the 3D pose that is represented using six DoF. The 3D model alignment apparatus 100 may render the retrieved target 3D model to a 2D image of the corresponding 3D pose. The 3D model alignment apparatus 100 may adjust an initial 2D input image based on the rendered 2D image. As described above, the 3D model alignment apparatus 100 may adjust the object of the 2D input image and the target 3D model.

In one example, the 3D model alignment apparatus 100 may adjust the target 3D model or the object based on the estimated 3D pose. The 3D model alignment apparatus 100 may readjust the adjusted object or the adjusted target 3D model based on the feature point of the object and the feature point of the target 3D model.

In another example, the 3D model alignment apparatus 100 may adjust the object or the target 3D model based on the feature point of the object and the feature point of the target 3D model. The 3D model alignment apparatus 100 may readjust the adjusted target 3D model or object based on the estimated 3D pose.

Figure 3:
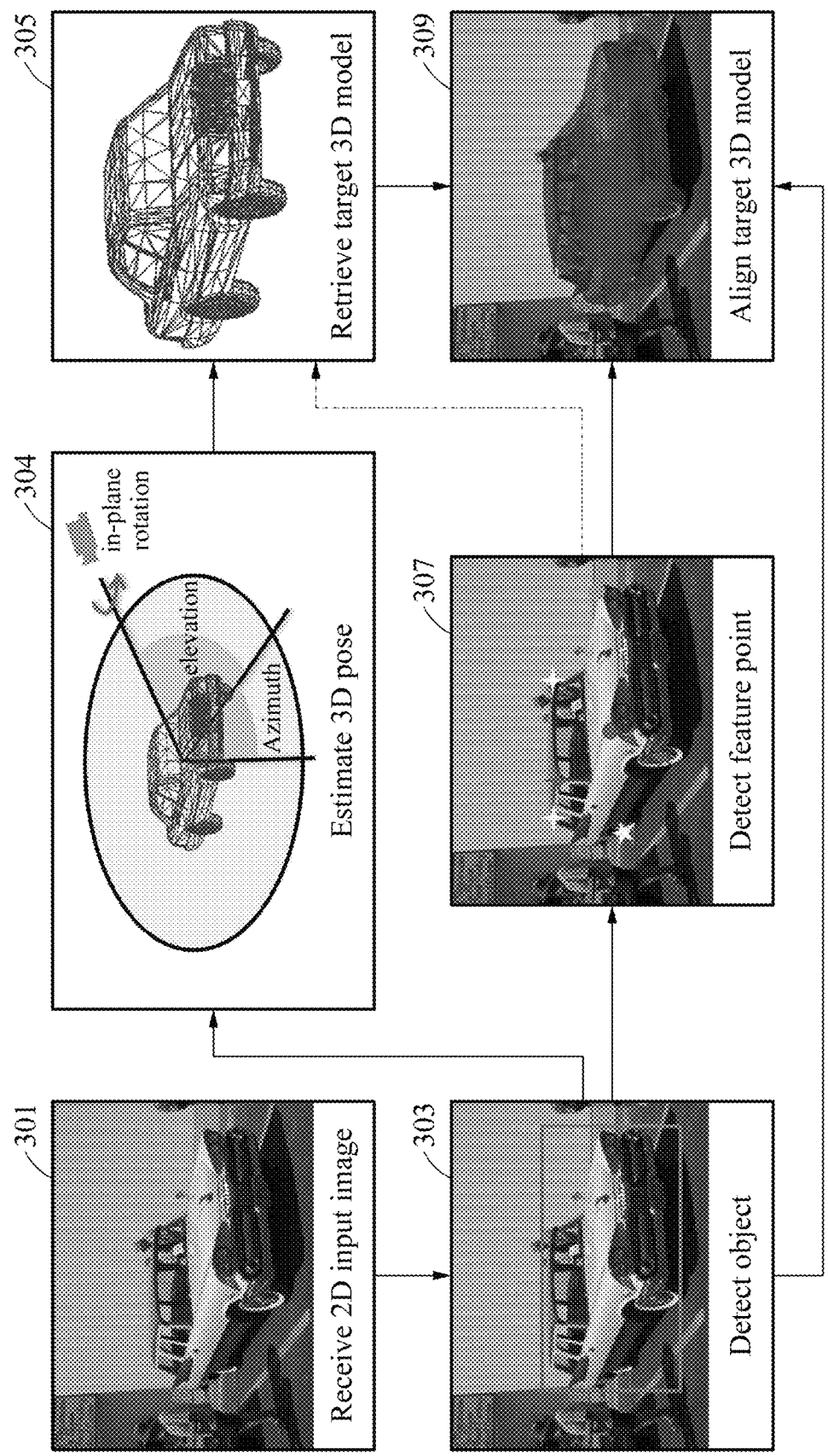
FIG. 3 illustrates an example of an operation of a 3D model alignment method.

FIG. 3 illustrates an example of an operation of a 3D model alignment method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, and devices such as a processor, that perform the specified functions, or combinations of special purpose hardware and computer instructions. In addition to the description of FIG. 3 below, the descriptions of FIGS. 1-2 are also applicable to FIG. 3 and are incorporated herein by reference. Thus, the above description may not be repeated here.

Referring to FIG. 3, in operation 301, the 3D model alignment apparatus 100 receives a 2D input image. At least one 2D input image is received and at least one more 2D input image is generated from the received at least one 2D input image. Each 2D input image may include an object of a different pose.

In operation 303, the 3D model alignment apparatus 100 detects the object in the 2D input image. Various image processing schemes may be applied to detect the object.

In operation 304, the 3D model alignment apparatus 100 estimates a 3D pose of the object in the 2D input image. In an example, the 3D pose may be represented using six DoF. Referring to FIG. 3, the 3D pose of the object is represented using an azimuth, an elevation, and an in-plane rotation, and the 3D pose further includes a distance and a principal point.

In operation 305, the 3D model alignment apparatus 100 retrieves a target 3D model. In an example, the 3D model alignment apparatus 100 retrieves the target 3D model based on the estimated 3D pose. In another example, the 3D model alignment apparatus 100 may retrieve the target 3D model based on a feature point detected in operation 307. In another example, the 3D model alignment apparatus 100 may retrieve the target 3D model based on the 3D pose and the feature point.

In operation 307, the 3D model alignment apparatus 100 detects the feature point of the object in the 2D input image. The 3D model alignment apparatus 100 acquires a feature of the object distinguished from the background. In an example, the feature point of the target 3D model may be prestored in a database with the target 3D model.

In operation 309, the 3D model alignment apparatus 100 aligns the target 3D model and the object. The 3D model alignment apparatus 100 aligns the target 3D model and the object based on the feature point of the target 3D model and the feature point of the object.

Figure 4:
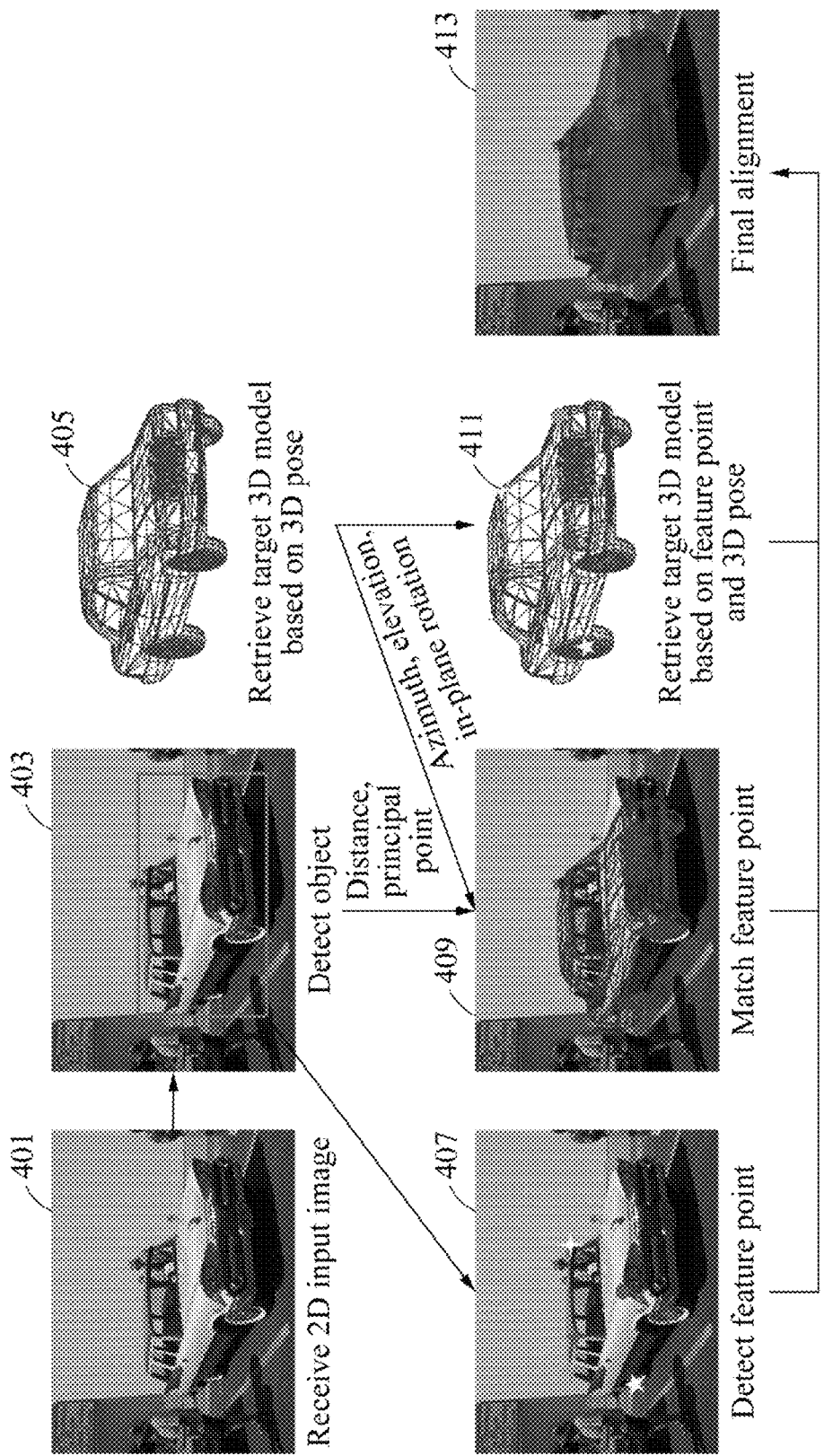
FIG. 4 illustrates an example of an operation of a 3D model alignment method.

FIG. 4 illustrates an example of an operation of a 3D model alignment method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, and devices such as a processor, that perform the specified functions, or combinations of special purpose hardware and computer instructions. In addition to the description of FIG. 4 below, the descriptions of FIGS. 1-3 are also applicable to FIG. 4 and are incorporated herein by reference. Thus, the above description may not be repeated here.

Referring to FIG. 4, in operation 401, the 3D model alignment apparatus 100 receives a 2D input image. In one example, the 3D model alignment apparatus 100 may receive a plurality of 2D input images of different poses. The 3D model alignment apparatus 100 may receive a first 2D input image including an object of a first pose and a second 2D input image including the object of a second pose different from the first pose. The 3D model alignment apparatus 100 may generate 2D input images of different poses from the received 2D input image. However, further description of a process of generating 2D input images of different poses is omitted for brevity. Therefore, the 3D model alignment apparatus 100 may reduce an amount of resources used to generate the 2D input image.

In another example, the 3D model alignment apparatus 100 may generate a 2D input image including an object of a different pose, based on the received 2D input image. The 3D model alignment apparatus 100 may receive a first 2D input image including an object of a first pose and may generate a second 2D input image including the object of a second pose different from the first pose. In an example, the 3D model alignment apparatus 100 may generate a 2D input image of a different pose using a generative adversarial network (GAN).

In operation 403, the 3D model alignment apparatus 100 detects the object in the 2D input image. Various image detection schemes may be used to detect the object. However, further description of image detection schemes is omitted for brevity The 3D model alignment apparatus 100 estimates a 3D pose of the object. In an example, the 3D pose may be represented using six DoF. DoF information may include an azimuth a, an elevation e, an in-plane rotation e, a distance d, and a principal point (u, v). The 3D model alignment apparatus 100 may estimate a distance and a principal point of the object while detecting the object and may also estimate the 3D pose through a separate process.

In operation 405, the 3D model alignment apparatus 100 retrieves a target 3D model based on the 3D pose. In an example, the 3D model alignment apparatus 100 classifies a type of the object using the neural network. The 3D model alignment apparatus 100 estimates the 3D pose of the object based on the type of the object and retrieves the target 3D model based on the estimated 3D pose. Here, the 3D model alignment apparatus 100 may further accurately determine the azimuth, the elevation, and the in-plane rotation based on the target 3D model.

In operation 407, the 3D model alignment apparatus 100 detects a feature point of the object in the 2D input image. In an example, the 3D model alignment apparatus 100 detects the feature point using the neural network. The neural network may be trained to detect the feature point of the object.

In operation 409, the 3D model alignment apparatus 100 aligns the detected object and target 3D model based on the 3D pose. In an example, the 3D model alignment apparatus 100 aligns the object and the target 3D model based on the distance, the principal point, the azimuth, the elevation, and the in-plane rotation. In an example, the 3D model alignment apparatus 100 may retrieve a candidate 3D model corresponding to each 2D input image that includes an object of a different pose. In an example, the 3D model alignment apparatus 100 may compare the feature point of the object of each 2D input image and a feature point of a candidate 3D model corresponding thereto and may determine a candidate 3D model having a relatively high similarity as the target 3D model.

In operation 411, the 3D model alignment apparatus 100 retrieves again the target 3D model based on the 3D pose and the feature point of the object. In an example, since the feature point of the object is used, compared to operation 405, a more accurate target 3D model may be retrieved.

The 3D model alignment apparatus 100 acquires a first feature of the object of the 2D input image. The 3D model alignment apparatus 100 acquires a second feature of a single candidate 3D model from among a plurality of candidate 3D models. The 3D model alignment apparatus 100 determines whether the candidate 3D model is the target 3D model based on the first feature and the second feature. The 3D model alignment apparatus 100 calculates a similarity between the first feature and the second feature. The 3D model alignment apparatus 100 may determine whether the candidate 3D model is the target 3D model based on the similarity.

In operation 413, the 3D model alignment apparatus 100 aligns the target 3D model and the object of the 2D input image that are further accurately retrieved based on the feature point. The 3D model alignment apparatus 100 may further accurately align the object and the target 3D model based on the 3D pose and the feature point.

Figure 5:
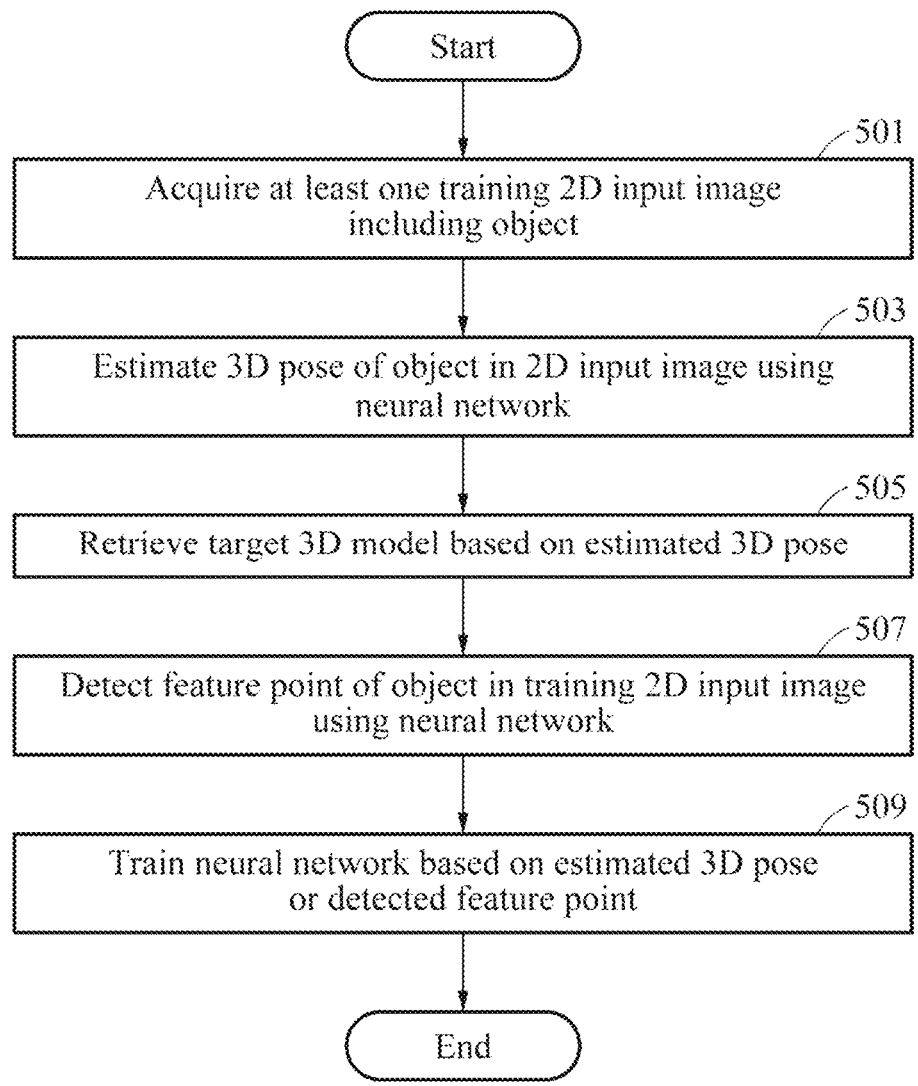
FIG. 5 is a diagram illustrating an example of a neural network training method for 3D model alignment.

FIG. 5 is a diagram illustrating an example of a neural network training method for 3D model alignment. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, and devices such as a processor, that perform the specified functions, or combinations of special purpose hardware and computer instructions. In addition to the description of FIG. 5 below, the descriptions of FIGS. 1-4 are also applicable to FIG. 5 and are incorporated herein by reference. Thus, the above description may not be repeated here.

Referring to FIG. 5, in operation 501, a training apparatus acquires at least one training 2D input image including an object. In an example, training data used to train a neural network includes a training 2D input image that is a real image and a composite image that is rendered through a 3D modeling program. The training apparatus acquires a composite image of at least one candidate 3D model of an estimated 3D pose. The training apparatus classifies a domain of each of the training 2D input image and the composite image using the neural network. The neural network processes the training data based on the classified domain.

In operation 503, the training apparatus estimates a 3D pose of the object in the 2D input image using the neural network. The training apparatus classifies a type of the object using the neural network. The training apparatus estimates a 3D pose of the object based on a result of the classification using the neural network. Estimation of the 3D pose may be modeled using a regression problem and modeled using a classification problem. The neural network may estimate the 3D pose based on a modeled structure.

In operation 505, the training apparatus retrieves a target 3D model based on the estimated 3D pose. In another example, the training apparatus may retrieve the target 3D model based on the 3D pose and the feature point. In another example, the training apparatus may retrieve the target 3D model based on the 3D pose and may then adjust or retrieve a further accurate target 3D model based on the 3D pose and the feature point.

In operation 507, the training apparatus detects the feature point of the object in the training 2D input image using the neural network. The training apparatus detects a feature point based on a different type. That is, the training apparatus may identify a feature point of an object of a different type.

In operation 509, the training apparatus trains the neural network based on the estimated 3D pose or the detected feature point. In an example, the target 3D model used to train the neural network based on the estimated 3D pose or the detected feature may be estimated or predetermined. The predetermined target 3D model may be a model that is set as a correct answer. The predetermined target 3D model may be stored in a database with information on the target 3D model. For example, the predetermined target 3D model may be an artificially annotated model. Annotation may indicate that the corresponding target 3D model is a correct answer or information on the corresponding target 3D model.

The training apparatus may train the neural network based on the classified type. The 3D pose, the feature point, or the target 3D model used to train the neural network based on the classified type may be posterior derived information or may be predetermined information. The predetermined 3D pose, feature point, or target 3D model may be a model that is set as a correct answer. For example, the predetermined 3D pose, feature point, or target 3D model may be artificially annotated. Annotation may indicate that the corresponding 3D pose, feature point, or target 3D model is a correct answer or may indicate information on the corresponding 3D pose, feature point, or target 3D model.

The training apparatus may train the neural network based on the classified domain. The 3D pose, the feature point, or the target 3D model used to train the neural network based on the classified type may be posterior derived information or may be predetermined information.

Figure 6:
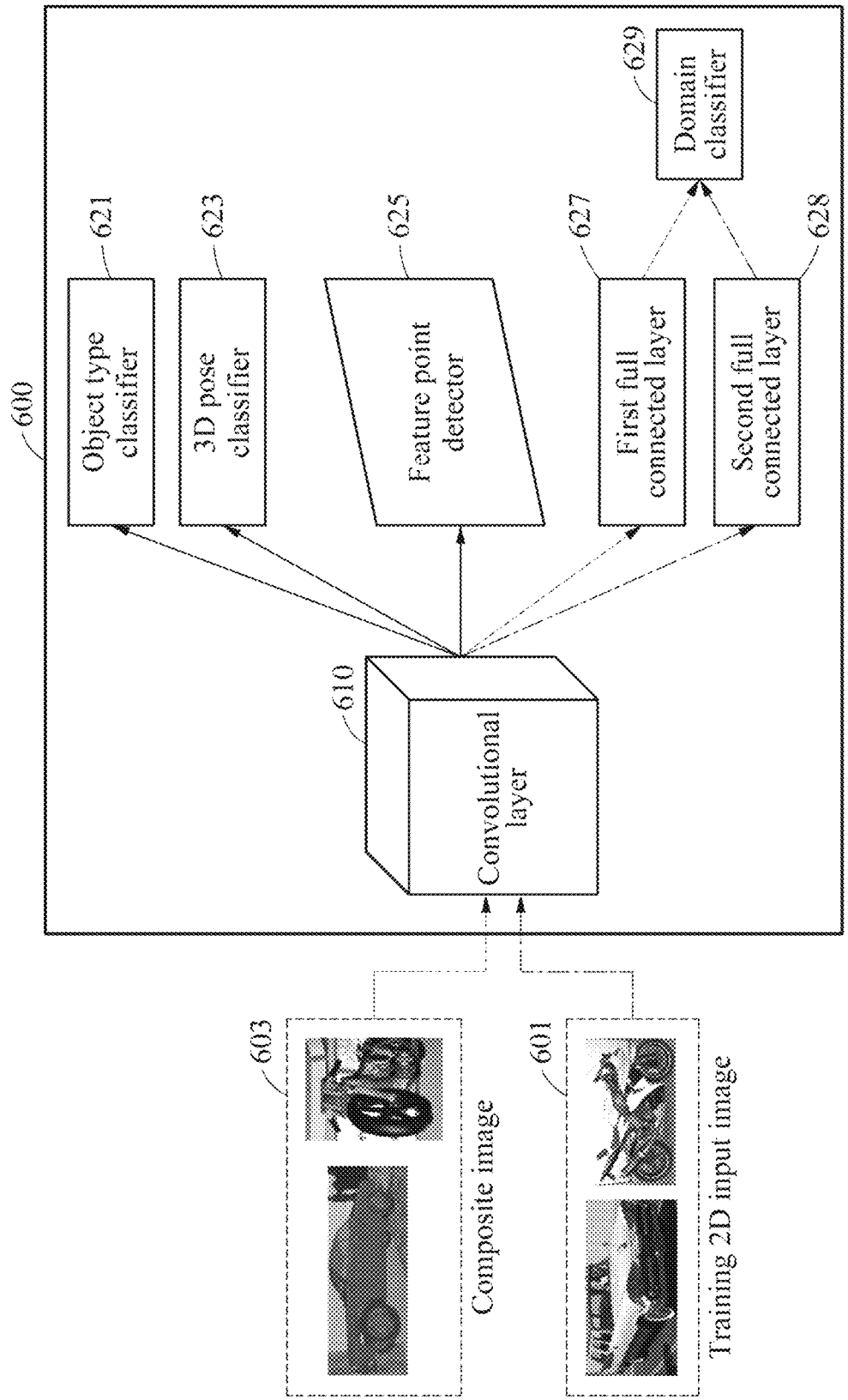
FIG. 6 illustrates an example of a structure of a neural network in a neural network training operation for 3D model alignment.

FIG. 6 illustrates an example of a structure of a neural network in a neural network training operation for 3D model alignment.

In one example, a neural network 600 may be used for various methods during a process of aligning an object and a target 3D model. In an example, the neural network 600 identifies a type of the object, estimates a 3D pose of the object, detects a feature point of the object, and classifies a composite domain and a real domain. Referring to FIG. 6, although the neural network 600 is described to simultaneously perform the aforementioned functions, it is provided as an example only. In another example, a separate neural network may be provided to perform each function.

Mass training data may be used to train the neural network 600. The training data may include a training 2D input image 601. The training 2D input image 601 may be a real image. However, the real image is limited and relatively large cost is used to analyze information corresponding to real image. A composite image 603 including analyzed information may be automatically configured using a 3D modeling program without a restriction on quantity. Accordingly, training data used to train the neural network 600 may include the training 2D input image 601 that is a real image and the composite image 603 that is rendered through the 3D modeling program. Here, the real image includes information on a type of the object, a 3D pose of the object, and a feature point. The composite image 603 includes information on the type of the object rendered using a 3D CAD model, the 3D pose of the object, and the feature point.

A difference is present between the composite image 603 and the real image, and a corresponding domain is distinguishable based on the difference. Here, the composite image 603 may belong to a composite domain and the real image may belong to a real domain. When the composite image 603 and the real image are input to a single neural network 600, the neural network 600 may not be readily compatible due to the difference between the composite image 603 and the real image. Unless the difference reduces, the neural network trained using the composite image 603 may lean to the composite domain. Accordingly, an inaccurate result may be derived in estimating the 3D pose, detecting the feature point, and aligning the 3D model using the real image.

To remove the difference between the composite image 603 and the real image, in an example, the neural network 600 includes a domain classifier 629. A gradient reversal layer (GRL) may be further provided in front of the domain classifier 629. The neural network 600 reduces the difference between the composite image 603 and the real image, and processes the composite image 603 and the real image through a single network architecture by including the domain classifier 629.

An input image of the neural network 600 may be, for example, a 224×224 image having three channels, RGB. Various structures may apply to a basic network (base net) of the neural network 600. For example, the basic network may use layers up to a full connected layer 7 (FC7) of VGG16 and may include a convolutional layer including a total of 13 layers and a full connected layer (FC6, FC7) including two layers. For example, the basic network may use Alex Net, ResNet, etc., in addition to VGG16.

Referring to FIG. 6, the neural network 600 includes an object type classifier 621, a 3D pose classifier 623, a feature point detector 625, and the domain classifier 629. The neural network 600 includes a convolutional layer 610, a first full connected layer 627, and a second full connected layer 628. Each of the object type classifier 621, the 3D pose classifier 623, the feature point detector 625, and the domain classifier 629 has a corresponding loss function.

The object type classifier 621 may use, for example, a softmax loss function or a hinge loss function.

For example, the 3D pose classifier 623 may be modeled using a regression problem and may be modeled using a classification problem. In an example, the regression problem relates to estimating a consecutive numerical value classifiable into a pose estimation and the classification problem relates to estimating a pose type. The 3D pose classifier 623 may use modeling corresponding to one of the two types. When regression problem modeling is applied, the 3D pose classifier 623 may use a smooth_LI loss function. When the classification problem modeling is applied, the 3D pose classifier 623 may use the softmax loss function or the hinge loss function. The following description is made based on an example in which regression problem modeling is applied.

The feature point detector 625 may use, for example, a cross entropy loss function. The cross entropy loss function and the softmax loss function may apply to different problems. If an actual value for detecting a feature point is set, a 2D channel using feature points of objects of different types as a set may be used. The neural network 600 may identify feature points present at different positions of the objects of the different types through the 2D channel. If corresponding coordinates are absent in a corresponding channel, a value of zero is allocated.

A dichotomy problem relates to classifying a composite domain and a real domain. The neural network 600 may be unaware of a domain corresponding to the 2D input image. The neural network 600 may be a different design based on a different network architecture. Accordingly, a difference between the composite domain and the real domain may be reduced. Although the difference may be reduced using a plurality of types of methods or network architectures, it is provided as an example only.

For example, the neural network 600 may be in the following structure. A basic network (base net) may be included in the neural network 600 and different full connected layers FC_C and FC_P may be connected to the basic network. The full connected layers FC_C and FC_P may be connected to a full connected layer 8 of the basic network. The full connected layer FC_C corresponds to a type of an object and a number of nodes of the full connected layer FC_C is identical to a total number of object types. With respect to 10 object types, the number of nodes of the full connected layer FC_C is 10. A softmax loss function L1 that is a loss function of the object type classifier 621 may be connected to an output of the full connected layer FC_C. Such a Base Net-FC_C-softmax loss function line corresponds to the object type and accordingly, may be used to identify the type of the object.

Each intersection point of the full connected layer FC_P corresponds to a single DoF of a 3D pose of the object. In the case of estimating a pose having six DoF, a number of intersection points of the full connected layer FC_P is set to 6. A loss function of the full connected layer FC_P is a smooth_L1 loss function L2. Such a Base Net-FC_P-smooth_L1 loss function line corresponds to the 3D pose of the object.

An output of a pooling layer 5 (pool5) of the basic network (base net) is connected to a single convolutional layer Conv_K and corresponds to feature point detection. A number of channels of the convolutional layer Conv_K is identical to a total number of all the feature points of all the object types. For example, if ten object types have a total of 100 feature points, the number of channels of the convolutional layer is set to 100. After passing through a 3×3 convolutional kernel, each channel has a size of 7×7. An output of the convolutional layer Conv_K is 100×7×7 and is connected to a cross entropy loss function L3 that is a loss function of the feature point detector 625. Such a Base Net (pool5)-Conv6 cross entropy function line corresponds to feature point detection.

To configure the domain classifier 629, a gradient reversal layer (GRL), full connected layers, and a full connected layer FC_D are sequentially connected to the basic network. In an example, the full connected layer FC_D may have two domains and a number of nodes of the full connected layer FC_D may be set to 2. In an example, the domain classifier 629 and a loss function L4 of the domain classifier 629 are sequentially connected. The softmax loss function or the hinge loss function may be used for the loss function L4 of the domain classifier 629. Such a Base Net-GRL-FC layers-FC_D-softmax loss function line is a network module that affects domains having different strength. It is provided as an example only. For example, an adversarial process of a GAN may be used.

During a training process, the composite image 603 and the real image are input to the neural network 600. A weighted sum of outputs of the respective loss functions of the object type classifier 621, the 3D pose classifier 623, the feature point detector 625, and the domain classifier 629, that is, L=a×L1+b×L2+c×L3+d×L4 is calculated as a final loss function. Here, each of a, b, c, and d denotes a weight. Training is completed when the loss function L is converged.

Referring to FIG. 6, input images of different domains may be processed through different paths. The composite image 603 corresponding to the composite domain is processed through a path indicated with a dotted line and a real image corresponding to the real domain is processed through a path indicated with a dash-dotted line. A path indicated with a solid line refers to a path that is commonly processed regardless of a domain.

Figure 7:
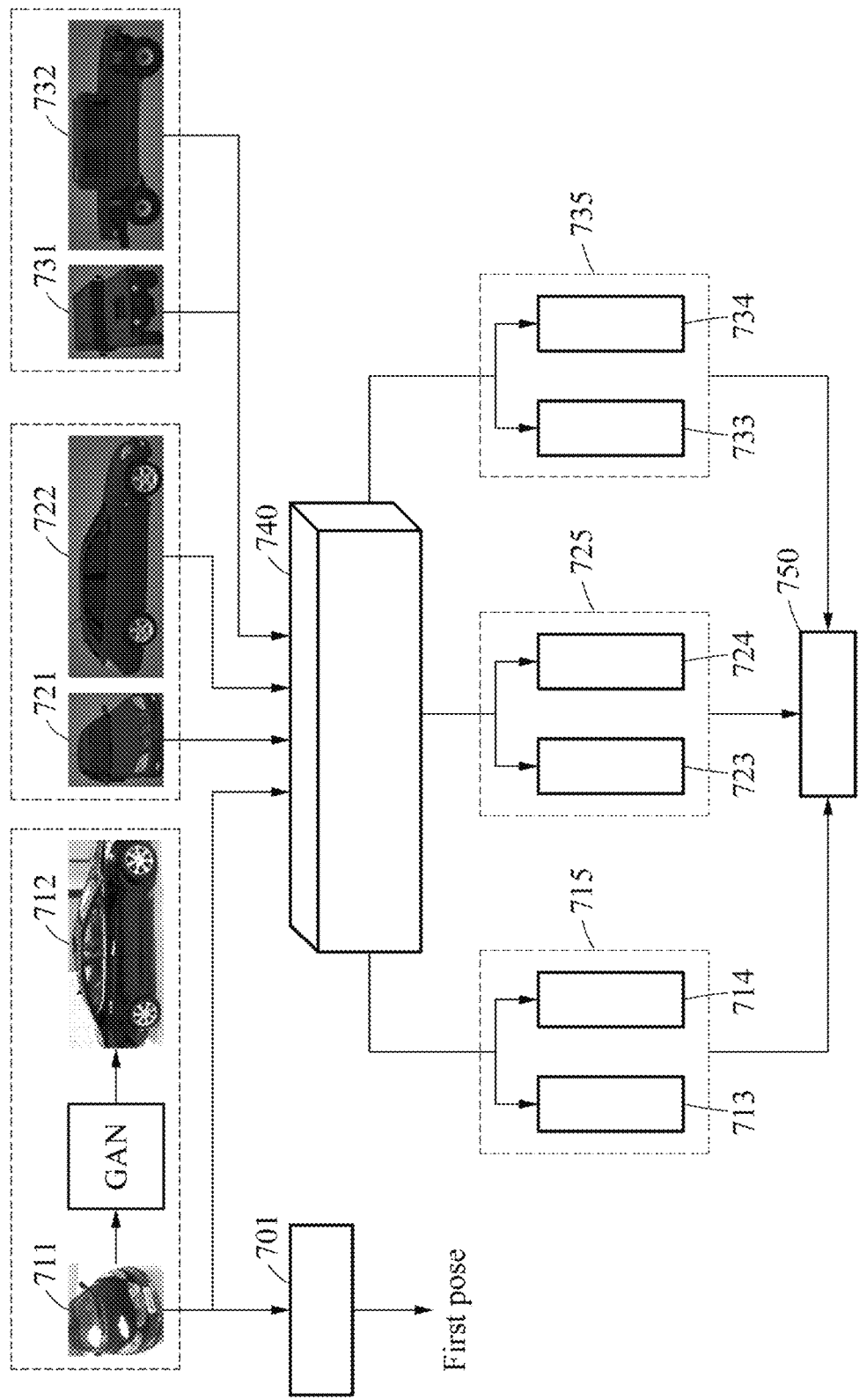
FIG. 7 illustrates an example of a process of receiving and processing images of different poses in a neural network in a neural network training operation for 3D model alignment.

FIG. 7 illustrates an example of a process of receiving and processing images of different poses in a neural network in a neural network training operation for 3D model alignment.

Training data may include a large amount of triad that includes a training 2D input image, a positive sample, and a negative sample. Here, an estimated 3D pose of the training 2D input image may be referred to as a first pose and another 3D pose may be referred to as a second pose. Each of the positive sample and the negative sample may include two composite images that are rendered using the first pose and the second pose. The positive sample and the negative sample may be rendered through at least one candidate 3D model, for example, a CAD 3D model. Here, the positive sample may refer to an image similar to the training 2D input image and the negative sample may refer to an image dissimilar to the training 2D input image.

The candidate 3D model may include a first candidate 3D model and a second candidate 3D model. A composition apparatus may acquire a first composite image of the first candidate 3D model of the estimated 3D pose, a second composite image of the first candidate 3D model of the second pose, a third composite image of the second candidate 3D model of the estimated 3D pose, and a fourth composite image of the second candidate 3D model of the second pose. For example, a similarity between the first candidate 3D model and the object may be greater than or equal to a threshold, and a similarity between the second candidate 3D model and the object may be less than the threshold.

Referring to FIG. 7, a training 2D input image 711 is input to the training apparatus. The training apparatus estimates a first pose of the training 2D input image 711. The training apparatus generates a training 2D input image 712 of a second pose from the training 2D input image 711. For example, the training apparatus generates the training 2D input image 712 using a GAN. The training apparatus prepares at least one sample image, for example, positive sample images 721 and 722, and negative sample images 731 and 732, corresponding to each of the first pose and the second pose. The training apparatus inputs prepared training data to a neural network.

The training apparatus normalizes images, for example, the training 2D input image 711 and 712, the positive sample images 721 and 722, and the negative sample images 731 and 732, of each triad to 224×224. The training apparatus inputs the normalized images to a base network 740 of the neural network. The base network 740 connects to full connected layers FC8_1 713, 723, and 733 and FC8_2 714, 724, and 734, corresponding to different poses for the respective images of the triads. In an example, a number of nodes of the full connected layers FC8_1 713, 723, and 733 and FC8_2 714, 724, and 734 may be set to 4096.

With respect to a pair of images having different poses, the neural network may output a feature of each image. For example, a feature vector corresponding to the training 2D input image 711, a feature vector corresponding to the generated training 2D input image 712, a feature vector corresponding to the positive sample image 721, a feature vector corresponding to the positive sample image 722, a feature vector corresponding to the negative sample image 731, and a feature vector corresponding to the negative sample image 732 may be output.

Features of the respective image pairs may be fused. A fused feature of the training 2D input image 711 and the generated training 2D input image 712 corresponding to the real image may be referred to as a first feature, and a fused feature of the positive sample images 721 and 722 or the negative sample images 731 and 732 corresponding to the composite image may be referred to as a second feature. Each of the positive sample images 721 and 722 and the negative sample images 731 and 732 may be rendered from each corresponding candidate 3D model.

Features corresponding to different poses passing through FC8_1 or FC8_2 for the respective images of a triad may be fused. Features corresponding to different poses may be concatenated, may be convoluted through a convolutional layer, or may be fused through another network architecture, for example, a long short-term memory model (LSTM). Referring to FIG. 7, an output of the full connected layer FC8_1 713 and an output of the full connected layer FC8_2 714 corresponding to the training 2D images 711 and 712 are fused through a fusion structure 715. An output of the full connected layer FC8_1 723 and an output of the full connected layer FC8_2 724 corresponding to the positive sample images 721 and 722 may be fused through a fusion structure 725. An output of the full connected layer FC8_1 733 and an output of the full connected layer FC8_2 734 corresponding to the training 2D images 711 and 712 may be fused through a fusion structure 735.

The training apparatus may calculate a similarity between the first feature and the second feature. Once the features of images of different poses are fused, three features may be input to a loss function that determines a single similarity. The loss function may include, for example, a triplet loss function. For example, the training apparatus may calculate Euclidean distance between the first feature and the second feature of the positive sample image 721, 722. If the Euclidian distance is small, it indicates relatively high similarity. A candidate 3D model corresponding to a largest similarity may be determined as a target 3D model.

Through the training process, parameters of the neural network may be trained such that a feature of a training 2D input image may become closer to that of a positive sample and may be away from that of a negative sample.

Figure 8:
FIG. 8 illustrates an example of applying a 3D model alignment apparatus.

FIG. 8 illustrates an example of applying a 3D model alignment apparatus.

An object motion estimation apparatus estimates a motion of an object based on a result of a 3D model alignment apparatus. The object motion estimation apparatus acquires at least one 2D input image including the object. The object motion estimation apparatus detects a feature point of the object in the 2D input image using a neural network. The object motion estimation apparatus estimates a 3D pose of the object in the 2D input image using the neural network. The object motion estimation apparatus retrieves a target 3D model based on the estimated 3D pose. The object motion estimation apparatus aligns the target 3D model and the object based on the feature point. The object motion estimation apparatus estimates a motion of the object based on the aligned 3D model.

Referring to FIG. 8, the object motion estimation apparatus that is installed in an autonomous driving vehicle 802 detects a feature point in a 2D input image of an object 801 estimated from a driving scene, and estimates a 3D pose of the object 801. The object motion estimation apparatus may capture an image of a vehicle coming from a left road through a camera mounted on the autonomous driving vehicle 802, may estimate a 3D pose or a feature point of the oncoming vehicle from a corresponding 2D input image, and may determine a target 3D model that matches the oncoming vehicle. The object motion estimation apparatus may estimate a position and a driving direction of the object 801 on a 3D map, a vehicle size, and a travel direction, and a speed based on 3D information of the target 3D model.

Figure 9:
FIG. 9 illustrates an example of applying a 3D model alignment apparatus.

FIG. 9 illustrates another example of applying a 3D model alignment apparatus.

An object texture display apparatus displays a texture on the surface of an object based on a result of a 3D model alignment apparatus. The object texture display apparatus acquires at least one 2D input image including the object. The object texture display apparatus detects a feature point of the object in the 2D input image using a neural network. The object texture display apparatus estimates a 3D pose of the object in the 2D input image using the neural network. The object texture display apparatus retrieves a target 3D model based on the estimated 3D pose. The object texture display apparatus aligns the target 3D model and the object based on the feature point. The object texture display apparatus displays the texture on the surface of the object based on the aligned 3D model.

Referring to FIG. 9, the object texture display apparatus displays a texture on the surface of an object based on an accurate result of aligning a target 3D model and a 2D input image in augmented reality. The object texture display apparatus determines the surface of the target 3D model on which the texture is to be displayed based on a 3D pose estimated from the 2D input image. The object texture display apparatus may derive a result 901 that the texture appears to be marked on the surface of the object by aligning the target 3D model and the object, by displaying the texture on the surface of the object, and by removing the target 3D model.

Figure 10:
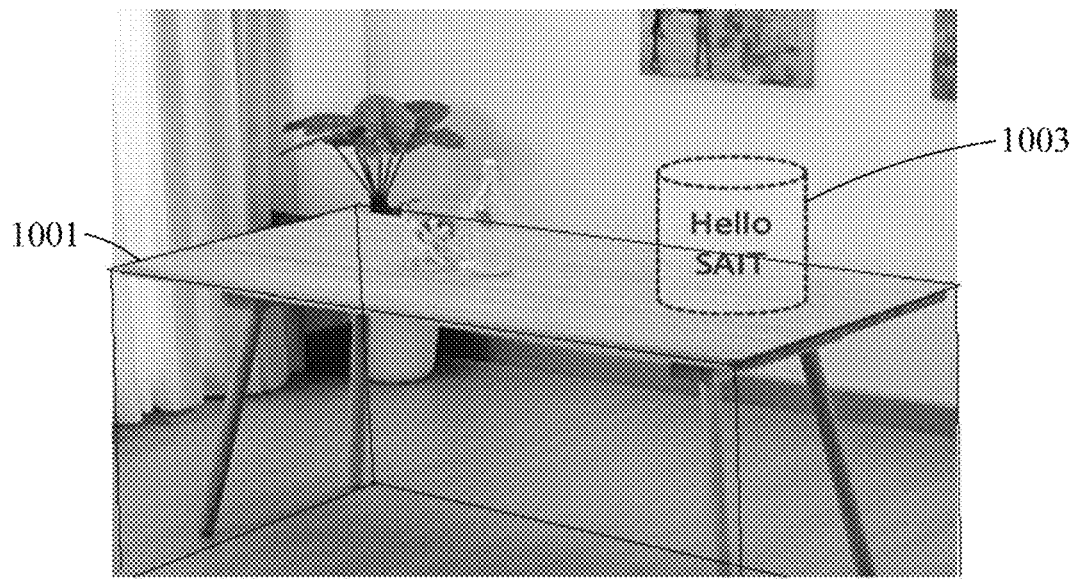
FIG. 10 illustrates an example of applying a 3D model alignment apparatus.

FIG. 10 illustrates another example of applying a 3D model alignment apparatus.

A virtual 3D image display apparatus displays a virtual 3D image in augmented reality based on a result of a 3D model alignment apparatus. The virtual 3D image display apparatus acquires at least one 2D input image including an object. The virtual 3D image display apparatus detects a feature point of the object in the 2D input image using a neural network. The virtual 3D image display apparatus estimates a 3D pose of the object in the 2D input image using the neural network. The virtual 3D image display apparatus retrieves a target 3D model based on the estimated 3D pose. The virtual 3D image display apparatus aligns the target 3D model and the object based on the feature point. The virtual 3D image display apparatus displays the virtual 3D image based on the aligned 3D model.

Referring to FIG. 10, the virtual 3D image display apparatus displays a virtual cylinder 1003 disposed on a real desk 1001 in augmented reality. The virtual 3D image display apparatus estimates a 3D pose of the desk 1001 and places the virtual cylinder 1003 based on the 3D pose. The virtual 3D image display apparatus acquires 3D information of the desk 1001 by estimating the 3D pose of the desk 1001 and by acquiring a target 3D model of the desk 1001. The virtual 3D image display apparatus displays the virtual cylinder 1003 such that a lower portion of the virtual cylinder 1003 and an upper portion of the desk 1001 may tightly fit based on the 3D information.

Figure 11:
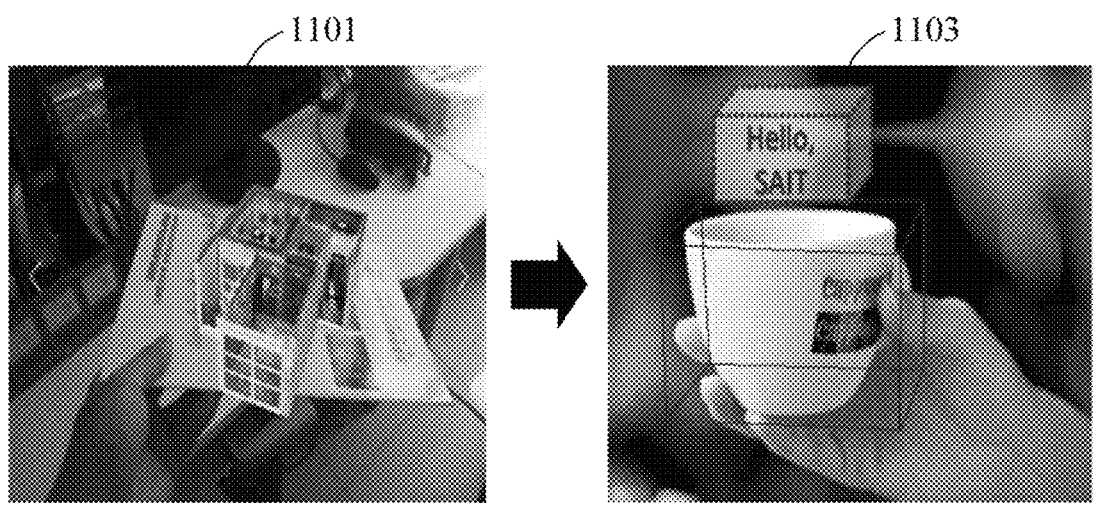
FIG. 11 illustrates an example of applying a 3D model alignment apparatus.

FIG. 11 illustrates another example of applying a 3D model alignment apparatus.

A virtual 3D image control apparatus controls a virtual 3D image using a result of a 3D model alignment apparatus. Referring to FIG. 11, the virtual 3D image control apparatus controls the virtual 3D image based on a 3D pose of a real object, feature point information, or a target 3D model. For example, referring to a screen 1101, a paper held by a person may function as a 2D AR marker that is an AR display tool. Referring to a screen 1103, a cup a person is holding may function as a 3D AR marker. The virtual 3D image control apparatus estimates a 3D pose of a real object and sets a target 3D model to match the real object. In response to a movement of the real object, the virtual 3D image control apparatus changes the target 3D model.

For example, the virtual 3D image control apparatus may apply to adjust an arm of a robot. The virtual 3D image control apparatus may receive a 2D input image from the arm of the robot through a camera, may estimate a 3D pose of the arm of the robot, and may detect a feature point. The virtual 3D image control apparatus may retrieve a target 3D model corresponding to the arm of the robot. The virtual 3D image control apparatus may acquire 3D information of the arm of the robot using the target 3D model and may recognize and control a position for holding the arm of the robot, a hand motion, and the like.

Figure 12:
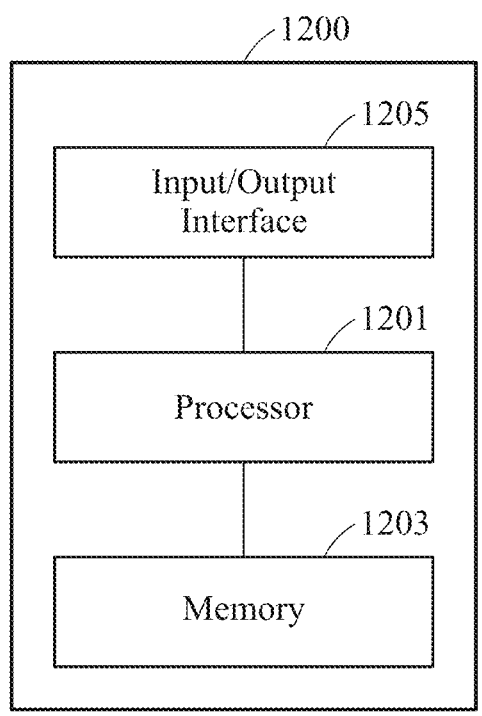
FIG. 12 illustrates an example of a 3D model alignment apparatus.

FIG. 12 illustrates an example of a 3D model alignment apparatus.

Referring to FIG. 12, a 3D model alignment apparatus 1200 includes at least one processor 1201, a memory 1203 configured to store a neural network, and an input/output interface 1205. Although not illustrated, the 3D model alignment apparatus 1200 may further include a database. Also, the 3D model alignment apparatus may further include a transceiver. The memory 1203 may store the neural network or at least one candidate 3D model. The database may store the candidate 3D models. Further details on the memory 1203 is provided below.

The 3D model alignment apparatus 1200 acquires at least one 2D input image including an object. The processor 1201 detects a feature point of the object in the 2D input image using the neural network. The processor 1201 estimates a 3D pose of the object in the 2D input image using the neural network. The processor 1201 retrieves a target 3D model based on the estimated 3D pose. The processor 1201 aligns the target 3D model and the object based on the feature point. The processor 1201 may be a data processing device configured as hardware having a circuit in a physical structure to implement desired operations. For example, the desired operations may include codes or instructions included in a program. For example, the data processing device configured as hardware may include a microprocessor, a central processing unit (CPU), a processor core, a multicore processor, a reconfigurable processor, a multiprocessor, an application-specific integrated circuit (ASIC), a field programmable gate array (FPGA), a graphics processor unit (GPU), or any other type of multi- or single-processor configuration. Further details on the processor 1201 is provided below.

In an example, the input/output interface 1205 may be a display that receives an input from a user or provides an output. In an example, the input/output interface 1205 may function as an input device and receives an input from a user through a traditional input method, for example, a keyboard and a mouse, and a new input method, for example, a touch input, a voice input, and an image input. Thus, the input/output interface 1205 may include, for example, a keyboard, a mouse, a touchscreen, a microphone, and other devices that may detect an input from a user and transmit the detected input to the data processing apparatus 800.

In an example, the input/output interface 1205 may function as an output device, and provide an output of the 3D model alignment apparatus 1200 to a user. The input/output interface 1205 may include, for example, a display, a touchscreen, and other devices that may provide an output to a user.

However, the input/output interface 1205 are not limited to the example described above, and any other displays, such as, for example, computer monitor and eye glass display (EGD) that are operatively connected to the 3D model alignment apparatus 1200 may be used without departing from the spirit and scope of the illustrative examples described. In an example, the 3D model alignment apparatus 1200 is a physical structure that includes one or more hardware components that provide the ability to render a user interface, render a display, and/or receive user input.

The 3D model alignment apparatus 1200 may be implemented in various electronic devices, such as, for example, a mobile telephone, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a head-up display (HUD), a handheld game console, an e-book, a television (TV), a high definition television (HDTV), a smart TV, a smart appliance, a smart home device, or a security device for gate control, various Internet of Things (IoT) devices, an autonomous vehicle, an automatic or autonomous driving system, an intelligent vehicle, an advanced driver assistance system (ADAS), or any other device capable of wireless communication or network communication consistent with that disclosed herein.

In an example, the 3D model alignment apparatus 1200 may be connected to an external device, such as, for example, a personal computer (PC) or a network, via an input/output device of the external device, to exchange data with the external device.

The model alignment apparatus 100, 3D model alignment apparatus 1200, apparatuses and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of aligning a three-dimensional (3D) model. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of aligning a three-dimensional (3D) model, the method comprising:
   acquiring, by a processor, a first two-dimensional (2D) image including an object of a first pose;
   generating a second 2D input image including the object of a second pose that is different from the first pose;
   detecting, by the processor, a feature point of the object in the first 2D input image and the generated second 2D input image, using a neural network;
   estimating, by the processor, a 3D pose of the object in the first 2D input image and the generated second 2D input image, using the neural network;
   retrieving, by the processor, a target 3D model based on the estimated 3D pose; and
   aligning, by the processor, the target 3D model and the object based on the feature point.

2. The method of claim 1, wherein the acquiring of the at least one 2D input image comprises receiving a third 2D input image including the object of a third pose that is different from the first pose and/or the second pose.

3. The method of claim 1, further comprising:
   detecting the object in the first 2D input image.

4. The method of claim 1, wherein the estimating of the 3D pose comprises:
   classifying a type of the object using the neural network; and
   estimating the 3D pose of the object based on a result of the classification using the neural network.

5. The method of claim 1, wherein the retrieving of the target 3D model comprises:
   acquiring a first feature of the object in the first 2D input image;
   acquiring a second feature of a candidate 3D model from among candidate 3D models; and
   determining the candidate 3D model to be the target 3D model based on the first feature and the second feature.

6. The method of claim 5, wherein the determining comprises:
   calculating a similarity between the first feature and the second feature; and
   determining the candidate 3D model to be the target 3D model based on the similarity.

7. The method of claim 1, further comprising:
   adjusting the object or the target 3D model based on the estimated 3D pose, the feature point of the object, and a feature point of the target 3D model.

8. The method of claim 7, wherein the adjusting comprises:
   adjusting the target 3D model or the object using the estimated 3D pose; and
   readjusting the adjusted object or the adjusted target 3D model based on the feature point of the object and the feature point of the target 3D model.

9. The method of claim 7, wherein the adjusting comprises:
   adjusting the object or the target 3D model based on the feature point of the object and the feature point of the target 3D model; and
   readjusting the adjusted object or the adjusted target 3D model based on the estimated 3D pose.

10. A non-transitory computer-readable storage medium storing instructions that, when executed by a processor, cause the processor to perform the method of claim 1.

11. A method of training a neural network, the method comprising:
    acquiring, by a processor, a first training two-dimensional (2D) input image including an object of a first pose;
    generating a second training 2D input image including the object of a second pose that is different from the first pose;
    estimating, by the processor, a three-dimensional (3D) pose of the object in the first training 2D input image and the second training 2D input image, using the neural network;
    retrieving, by the processor, a target 3D model based on the estimated 3D pose;
    detecting, by the processor, a feature point of the object in the first training 2D input image and the second training 2D input image using the neural network; and
    training, by the processor, the neural network based on the estimated 3D pose or the detected feature point.

12. The method of claim 11, wherein the estimating of the 3D pose comprises:
    classifying a type of the object using the neural network;
    estimating the 3D pose of the object based on a result of the classification using the neural network, and
    the training of the neural network comprises training the neural network based on the classified type.

13. The method of claim 11, further comprising:
    acquiring a composite image of at least one candidate 3D model of the estimated 3D pose; and
    classifying a domain of each of the first training 2D input image and the composite image using the neural network,
    wherein the training of the neural network comprises training the neural network based on the classified domain.

14. The method of claim 13, wherein the acquiring of the composite image comprises acquiring a first composite image of a first candidate 3D model of the estimated 3D pose, a second composite image of the first candidate 3D model of a second pose, a third composite image of a second candidate 3D model of the estimated 3D pose, a fourth composite image of the second candidate 3D model of the second pose, and the at least one candidate 3D model comprising the first candidate 3D model and the second candidate 3D model.

15. The method of claim 14, wherein a similarity between the first candidate 3D model and the object is greater than or equal to a threshold and a similarity between the second candidate 3D model and the object is less than the threshold.

16. A non-transitory computer-readable storage medium storing instructions that, when executed by a processor, cause the processor to perform the method of claim 12.

17. An apparatus for aligning a three-dimensional (3D) model, the apparatus comprising:
    a memory configured to store a neural network and instructions,
    a processor configured to execute the instructions to
    acquire a first two-dimensional (2D) image including an object of a first pose,
    generate a second 2D input image including the object of a second pose that is different from the first pose,
    detect a feature point of the object in the first 2D image and the generated second 2D input image, using the neural network,
    estimate a 3D pose of the object in the first 2D image and the generated second 2D input image, using the neural network, retrieve a target 3D model based on the estimated 3D pose, and align the target 3D model and the object based on the feature point.

* * * * *